United States Patent
Myrenne

[15] 3,661,011
[45] May 9, 1972

[54] HIGH-SPEED MICROVOLUME MEMBRANE OSMOMETRY

[72] Inventor: Karl-Dieter S. Myrenne, Sunnyvale, Calif.
[73] Assignee: Melabs, Inc.
[22] Filed: Mar. 2, 1970
[21] Appl. No.: 15,779

[52] U.S. Cl. ................................................. 73/64.3
[51] Int. Cl. ........................................... G01n 13/04
[58] Field of Search .......................... 73/64.3, 88.5 SD, 398

[56] References Cited

UNITED STATES PATENTS 3,063,288  11/1962  Reiff ........................................ 73/64.3
3,455,147  7/1969  Peck et al. ............................... 73/64.3

Primary Examiner—Louis R. Prince
Assistant Examiner—Joseph W. Roskos
Attorney—Robert B. Kennedy

[57] ABSTRACT

A membrane osmometer is disclosed comprising a semipermeable membrane having first and second opposing surfaces. Means are provided for receiving and confining a solvent in fluid communication with the first membrane surface. Means also are provided for receiving and confining a solution in fluid communication with the second membrane surface. The osmometer further includes a fluid supply inlet conduit, an outlet conduit, and a distributing valve having at least two positions whereby fluid communication may be established between the conduits and the solvent receiving and confining means with the valve in a first position and between the conduits and the solution receiving and confining means with the valve in the second position. A semiconductor pressure transducer is also provided having a pressure-sensitive surface element in pressure communication with the contents of one of the receiving and confining means.

11 Claims, 7 Drawing Figures

INVENTOR.
KARL MYRENNE
BY
Armand G. Guibert
AGENT

INVENTOR
KARL MYRENNE
BY Armand G. Guilbert
AGENT

HIGH-SPEED MICROVOLUME MEMBRANE OSMOMETRY

BACKGROUND OF THE INVENTION

Membrane osmometers are used extensively for determination of the molecular weights of compounds with large molecules, namely, polymers and biological materials. Prior art automatic membrane osmometers (those dispensing with operator action other than filling and emptying of the osmometer with sample and solvent) have not been fully satisfactory because they required large amounts of sample and excessively long equilibrium time and/or because of their complexity.

One automatic osmometer disclosed in U.S. Pat. No. 3,063,288, requires samples of only 500 microliters in volume and has good sensitivity (to 18 millivolts/cm Hg), but still does not attain the limits necessary to make such instruments suitable for rapid microphysical analyses. Further, in that osmometer the necessity for a diaphragm and linkages intervening between the sample and the pressure sensor entails not only a more complicated structure, but also complex adjustments for lost motion between members and for zeroing.

Several other known automatic osmometers are generally similar to the unit disclosed in U.S. Pat. No. 3,187,562. Osmometers of this type employ a servo-controlled motor to adjust the height of the solvent level to maintain equilibrium with pressure on the solution side of the membrane. The pressure changes are detected by linkages between a diaphragm on the solution side which forms one plate of a capacitor controlling an oscillator, the oscillator output operating the servo-control. Such units suffer disadvantages not only in their obvious complexity, but also in that excessive pressure applied to the solution side of the membrane will short the diaphragm, causing damage and requiring complete disassembly of the cell in order to replace the diaphragm. Another version of this type of osmometer uses fragile capillary tubes with an air bubble and a photoelectric detector for operating the above-mentioned servo-control to maintain equilibrium in equally complex fashion.

One other automatic osmometer, that made by the Knauer Co. of Berlin, West Germany, is more similar to that disclosed in U.S. Pat. No. 3,063,288, but uses an inductive detection system coupled to the usual diaphragm. Thus, it too has a multiplicity of complex and costly parts.

SUMMARY OF THE INVENTION

In accordance with the above discussion of problems with prior art osmometers, it is an object of the invention to provide an improved membrane osmometer having high sensitivity.

Another object of the invention is to provide an improved membrane osmometer operable with very small volume samples in the range of 10–100 microliters.

Another object of the invention is to provide a simpler, more compact membrane osmometer.

The invention may be described briefly as a membrane osmometer comprising a semipermeable membrane, a member with a cavity for receiving and confining a solvent in fluid communication with one surface of the membrane, and another member with a cavity for receiving and confining a solution in fluid communication with the opposing surface of the membrane. A semiconductor pressure transducer having a pressure-sensitive surface element is located in the osmometer such that this element is in pressure communication with the contents of one of the cavities.

DESCRIPTION OF THE PREFERRED EMBODIMENTS

The membrane osmometer according to the invention is used for determining osmotic pressure which, as used herein, will be understood to include colloid osmotic pressure, sometimes referred to as "oncotic pressure." In a first embodiment, the osmometer comprises two separable blocks 10 and 12 (see FIG. 1) having matching cavities 14 and 16, respectively, in the respective faces forming a junction 18 when the blocks 10 and 12 are assembled. One or both cavities 14, 16 may be 25 microliters or less in volume. A semipermeable membrane 20 is clamped in the junction 18 between the blocks 10,12 to form two separate chambers with the cavities 14,16. The blocks will ordinarily be mounted in a temperature-controlled environment.

For osmotic purposes, as is known, membrane 20 must be semipermeable — that is, permeable to the solvent but not the solute of a solution. Collodion (cellulose nitrate) is an example of such a membrane, well known in the art, but the invention can be applied even more profitably in conjunction with recently developed, very high permeability membranes such as the type UM–1 of the Amicon Company.

Figure 1:
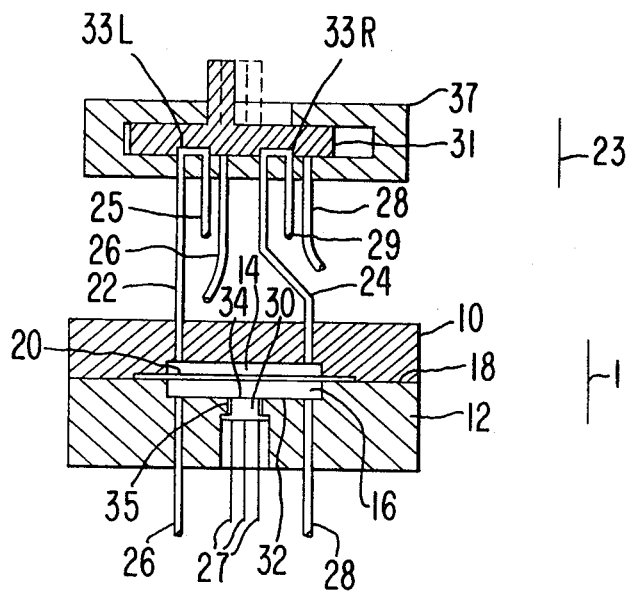
FIG. 1 is a cross-sectional view (except for the pressure transducer, which is not sectioned) of a membrane osmometer according to the principles of the invention.

Solution is admitted to one or the other of the cavities 14 or 16 through the related conduits or supply tubes 22,24 (or 26,28), pure solvent being admitted to the other cavity through its supply tubes 26,28 (or 22,24). The supply tubes, which are of a diameter and length such as to have minimal effect on the effective volume of sample — and solvent, too, of course — may then be closed by means of a distributing valve 23, a slide valve as shown in FIG. 1, although, as shown schematically in FIG. 3 and in detail in FIGS. 5 and 5a, a rotary motion valve similar to type No. 8032 made by Carle Instruments, Inc. of Fullerton, California is preferred. Then, as solvent diffuses through the membrane, either the increase in pressure in the solution chamber or decrease in pressure in the solvent chamber may be measured by means of a pressure-sensitive device located in the appropriate one of the two chambers, as is known.

According to my invention, a high-sensitivity, microdeflection pressure-sensitive semiconductor transducer device 30 is installed preferably flush with a wall 32 of one of the cavities (16 in FIG. 1) of my osmometric cell 1. Such transducers depend on the anisotropic stress effect in PN junctions, disclosed in U.S. Pat. No. 3,250,965, localized stress on one surface of a germanium diode causing a very large reversible conduction change across the underlying PN junction. This effect is not limited to germanium diodes, but occurs as well in PN junctions in other materials, such as silicon. Further, since the stress affects a simple junction, it also affects the characteristics of all multi-junction devices, e.g., transistors, four layer diodes, etc. Transducer 30 may be installed in the cell 1 by cementing it in position using a metal-to-metal adhesive 35 of the epoxy type if dealing with aqueous solutions, or with a mechanical clamping device and appropriate seal when dealing with organic solvents. For transducer 30, I prefer the so-called piezo-junction transistor made by Stow Laboratories, Inc., Stow, Massachusetts under the trademark PITRAN, although any other solid-state device based on the anisotropic stress effect could be used. The PITRAN (TM) device 30 is enclosed in a TO-46 size transistor metal can, the top 34 of which is the pressure-sensitive portion of the transducer. Any pressure applied to the top 34 of this can is transmitted directly to the internal pressure-sensitive PN junction of transducer 30.

Transducer 30 is located in osmometer cavity 16 such that only portion 34 is exposed to the liquid (FIG. 1). Transducer 30 can be located either in the solvent chamber to measure pressure reduction or in the solution chamber to measure pressure increase, as mentioned previously. It will be noted that a valve which operates without displacement of fluid into or out of the system and which connects the supply lines to either chamber, contributes significantly to proper operation of the invention because of the desired rapidity of measurement and small volume of chambers and supply lines.

Figure 2:
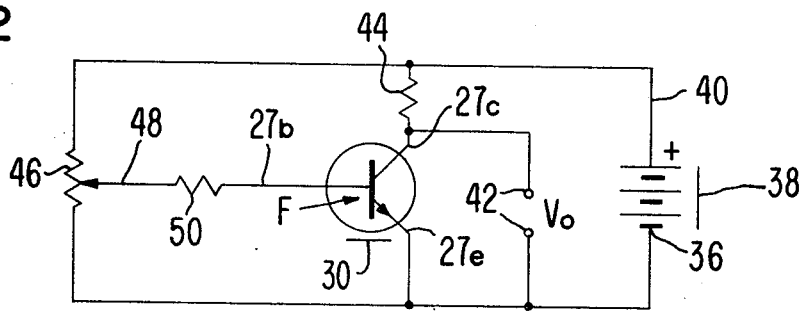
FIG. 2 shows a schematic of one circuit for converting the pressure input to an electrical output.

The measuring circuit can be realized in various ways. As piezo-junction devices work in the same manner as normal PN devices, they can be incorporated in any of the usual circuits. For example, the preferred device 30 — PITRAN (TM) — behaves like a conventional NPN transistor and can be biased substantially in any way that an ordinary transistor of that type is biased. FIG. 2 shows a simple circuit for converting pressure on the PN junction into an output voltage which can be measured with a meter either directly or after amplification. Piezo-junction devices can be connected in other circuits suitable to convert pressure into almost any other electrical characteristic such as current, frequency, etc. An output in variable frequency pulses is particularly useful for connecting the osmometer to a computing device for fully automating the osmometer, as will be seen.

In FIG. 2, transducer 30 is shown with its leads 27 connected to output terminals 42 and to a source of voltage 38 through appropriate circuit elements. The configuration shown is of the well-known common-emitter type with emitter lead 27e connected to negative pole 36 of a battery 38 and to one terminal (the common terminal) of output terminal pair 42. The other pole 40 of battery 38 is connected through a resistance 44 to the collector 27c of device 30 and to one end of voltage-dividing resistance 46. The other end of voltage divider 46 is connected to pole 36 of battery 38, and ergo to the common output terminal mentioned above. The other terminal of pair 42 is connected to collector 27c. Tap 48 of voltage divider 46 is connected via a resistance 50 to the base lead 27b of device 30. Thus, by appropriate positioning of tap 48, base lead 27b may be made sufficiently positive, with respect to emitter lead 27e, to bias transistor 30 into its active region. Application of a force F to the PN junction (as a result of pressure on the top 34) results in a change in current flow through the device, with according change in voltage drop across resistance 44 and thus in the output voltage signal across terminals 42.

In operation of the osmometer, by way of example, valve 23 would first be positioned as shown in FIG. 1 with slide 31 (which is urged into close, sealing contact with the mating portion of housing 37 by spring means not shown in FIG. 1) located such that channels 33L and 33R would provide communication between the inlet and outlet tubes 25 and 29, respectively connected to tubes 22 and 24 of cavity 14, allowing the cavity to be filled with solvent supplied to inlet tube 25. Valve 23 would then be operated to move slide 31 to the far right of the position shown in FIG. 1, thus connecting the inlet and outlet supply tubes 25 and 29, respectively with the supply tubes 26 and 28 of the lower chamber 16 via channels 33L and 33R. The hydrostatic head of the solvent in chamber 16 would then be varied over the desired range and the output voltage of terminals 42 measured, for purposes of calibrating the system. This having been done — with appropriate care to insure the absence of air bubbles, as usual — valve 23 would then be reset to its original position interconnecting the inlet and outlet tubes 25 and 29 with the supply lines to upper chamber 14 and the first of the desired samples then introduced into that chamber with equal care to insure the absence of bubbles. Slide 31 of valve 23 would then be moved to a central position with the inlet and outlet tubes 25 and 29 cut off from the supply lines to either chamber (or left in position, with the solution substantially under atmospheric pressure) and the output of the transducer (relating to the decrease in solvent pressure in chamber 16, as here described) noted as a function of time until equilibrium is achieved. The procedure for the next sample would be to connect the inlet line 25 to a supply of solvent to flush the previous sample out of chamber 14 and at the same time restore the desired initial pressure in chamber 16 by allowing the solvent to diffuse back into that chamber. For greater speed, of course, restoration of the initial pressure in chamber 16 may be achieved by moving slide 31 again to the far right position momentarily, and thereafter returning it to the position shown in FIG. 1. The new sample is then introduced into sample chamber 14, the output readings again being measured as a function of time. The rapidity of the measurement sequence is thus clear.

Figure 3A:
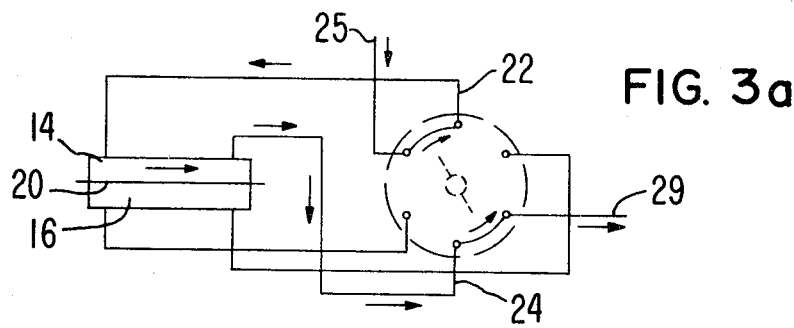
FIGS. 3a, 3b are schematics of the valving and flow circuits for handling the small volume samples according to the invention.
Figure 3B:
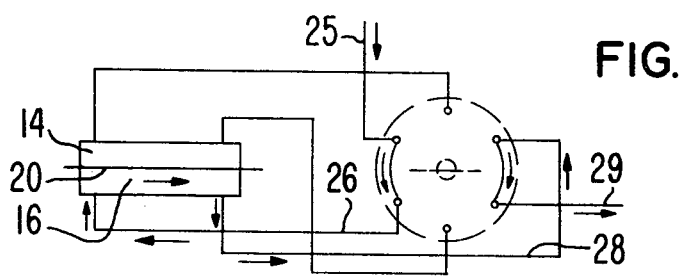

The foregoing discussion was based on the use of a simple slide valve as shown in FIG. 1, but the description would apply equally well to a rotary motion valve as shown in FIGS. 3a and 3b, the channels in valve member 31 here being arcuate and of a length so as to encompass the terminus of a supply line and the inlet (or outlet) tube. In the position of FIG. 3a, fluid flow — as marked by the arrows — occurs through cavity 14. If the valve member is then rotated counterclockwise, bringing the channels to the position shown in FIG. 3b, then fluid flow — again marked by arrows — occurs through cavity 16. By rotating the valve member clockwise again to a position midway to the original position, all intercommunication between conduits is broken. The rotary valve of FIGs. 3a, 3b is thus seen to be fully equivalent to the slide valve of FIG. 1.

Figure 5:
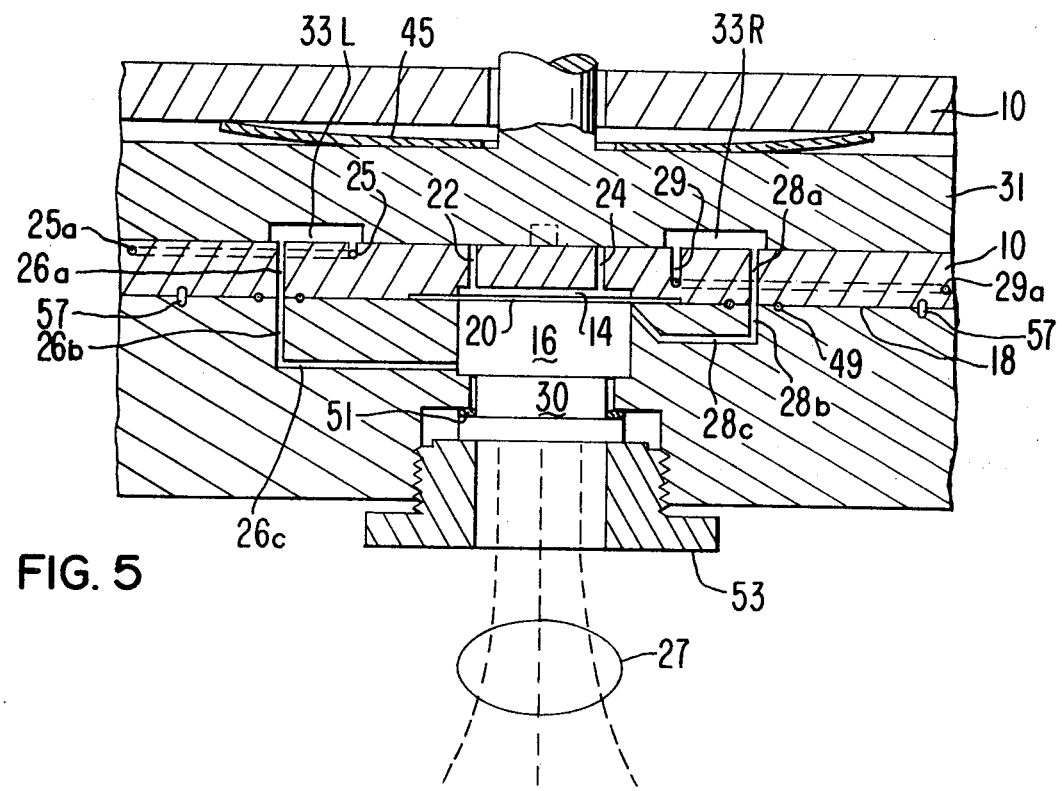
FIG. 5 is a cross-sectional view (again excepting the pressure transducer) of an alternate embodiment of the membrane osmometer according to the invention, the valving being unitary with one of the chamber blocks and the supply lines being self-contained.
Figure 5A:
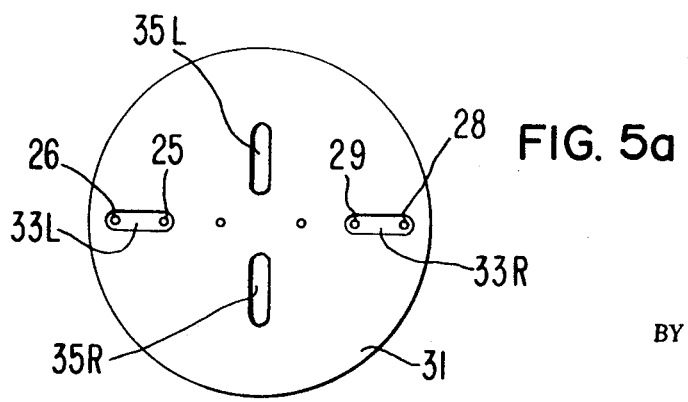
FIG. 5a is a view of the lower face of the valve disk of FIG. 5.

FIG. 5 shows a preferred embodiment in which distributing valve 23 is made unitary with block 10, the latter being provided with a shallow circular sample cavity 14 and the supply lines 25 and 29 being bored only partially through block 10 and intersecting respective lateral passages 25a, 29a leading to the side surfaces (not shown) of block 10. The valve member 31 is a disk and designed for rotary operation in this embodiment, the lateral motion now being angular and in a plane normal to and centered on the axis of circular cavity 14, such that in the position shown in FIG. 5 the inlet and outlet supply tubes 25, 29 are respectively connected to conduits 26, 28 of cavity 16 by means of the channels 33L and 33R. The Belleville washer 45 between the upper portion of block 10 and the valve member 31 urges the latter into intimate, sealing contact with the lower portion of block 10. As shown in FIG. 5a, valve member 31 is provided with another pair of channels 35L and 35R located closer to its center such that upon its rotation (equivalent to the lateral movement of the slide of the first embodiment) through an appropriate angle (approximately 90° according to the sketch of FIG. 5a, but any angle providing suitable isolation of the channels to the respective cavities would suffice), supply lines 25, 29 are connected instead to conduits 22, 24 of cavity 14, the length of these conduits now being very short and determined substantially by the thickness of the lower portion of block 10, a thickness which need only be sufficient to allow for the passages 25a, 29a and the length of aligning pins 57, discussed subsequently.

In the embodiment of FIG. 5, the conduits 26 and 28 are each formed of three parts — a, b and c — the first part, a, of each conduit being a simple passage bored through block 10 at a location communicating with the related one of the channels 33L or 33R when member 31 is in the position shown in FIG. 5. The continuation of these conduits, parts b and c, in block 12 comprises short passages, b, bored partly through block 12 at right angles to the plane of its longest dimension and connecting to cavity 16 via intersecting lateral passages, c, substantially parallel to the plane of block 12. The lateral passages, c, may include portions inclined at a small angle with respect to that plane, if desired, to separate the inlet and outlet levels at the cavity for purposes of minimizing air entrapment in the deeper cavity 16.

To insure proper alignment of blocks 10 and 12 such that conduits 26a and 28a are not displaced relative to their respective matching portions 26b and 28b, a pair of pilot pins 57 are disposed on the surface of block 12 facing block 10 and engage appropriately located alignment holes in the surface of block 10 forming the junction 18 with block 12.

It is noted also with respect to FIG. 5 that though transducer 30 has been shown as being mounted in cavity 16, i.e., the solvent cavity, it is possible by further modifications to position transducer 30 in block 10 as one wall of cavity 14. Such modifications might include, for instance, making valve member 31 an annulus, and making the radial dimension of cavity 14 large enough that conduits 22, 24 could be located outward of the periphery of transducer 30, or alternatively, inclining the conduits 22, 24 for purposes of providing the necessary clearance with respect to transducer 30. If valve member 31 where an annulus and transducer 30 were clamped and sealed in position in known fashion by means of a screw ring 53 and an "O-ring" 51, as shown in FIG. 5, obviously the aperture of the annulus would have to be large enough to clear screw ring 53. Though not specifically shown, such positioning of transducer 30 in the sample cavity is intended to be within the scope of the invention.

Figure 4:
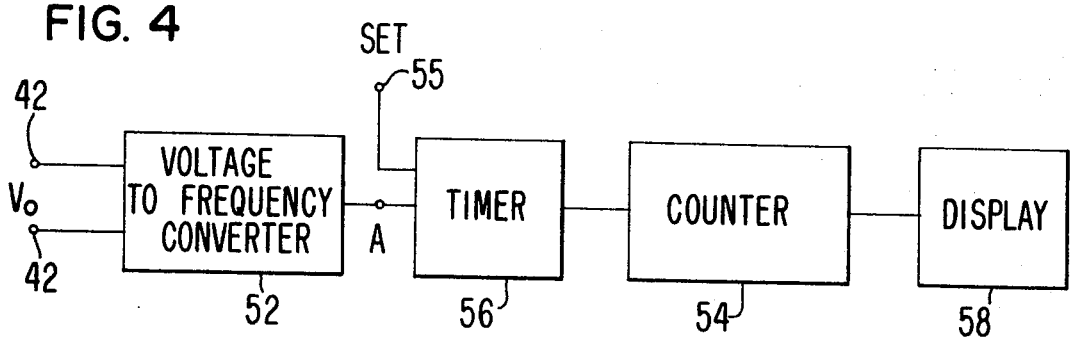
FIG. 4 is a block diagram of pulse generating, timing, arithmetic and display elements for converting the output of the circuit of FIG. 2 into a decimal digit output.

As mentioned above, the output of device 30 may be used to provide variable frequency pulses for operation of a computing device. A block diagram of this is shown in FIG. 4 where the variable voltage output on terminal pair 42 is supplied to a voltage-to-frequency converter 52 similar to the one shown in FIG. 13.63, page 346, of the GE Transistor Manual published in 1964 by the General Electric Company. The periodic waveform output of converter 52 may be supplied to a counter 54 and a display 58 through a timer 56 such that a fixed time base is supplied to counter 54 in order to relate the counter output to the pressure sensed by device 30. Counter 54 may be a ring counter with visual readout as shown in FIG. 7.23, page 203, of the above-mentioned manual, thus combining the display 58. As to timer 56, it may be similar to the solid state time delay circuit shown in FIG. 13.30, page 321, of the above-mentioned manual with the exception that its output would have to be inverted inasmuch as the purpose of timer 56 is to allow passage of the pulses from converter 52 only during the period when timer 56 has been set in operation.

Circuits for the above-mentioned components could also be taken from the "Sourcebook of Electronic Circuits" by John Markus, Editor, published in 1968 by McGraw-Hill, Inc. As implied in FIG. 4, the timer 56 is triggered manually via the set input, but it is obvious that it could be timed periodically so as to sample the output of the device 30 using a relaxation oscillator with a long period cycle in place of the one shot timer of FIG. 13.30 of the manual cited. If the display 58 is desired to be in direct decimal figures, a Nixie tube ring counter similar to the one shown in FIG. 16.47, page 430, of the first-mentioned manual could be used.

From the foregoing, it is evident that there has been disclosed a high-speed microvolume membrane osmometer using a high-sensitivity, small deflection semiconductor transducer which provides fast response and requires only a small volume of sample or solvent.

As will be evident to those skilled in the art, the above-described invention is subject to other modifications. The detailed description is therefore given merely by way of illustration and example, with the intention that the spirit and scope of the invention be limited only by the appended claims.

I claim:

1. A membrane osmometer comprising:
   a semipermeable membrane having first and second opposing surfaces;
   means for receiving and confining a solvent in fluid communication with said first membrane surface;
   means for receiving and confining a solution in fluid communication with said second membrane surface;
   a fluid supply inlet conduit;
   an outlet conduit;
   a laterally positionable distribution valve having at least two positions, fluid communication being established between said conduits and said solvent receiving and confining means with said valve in a first position and between said conduits and said solution receiving and confining means with said valve in the second position; and
   a semiconductor pressure transducer having a pressure-sensitive surface element in pressure communication with the contents of one of said receiving and confining means.

2. A membrane osmometer comprising:
   a semipermeable membrane having first and second opposing surfaces;
   means for receiving and confining a solvent in fluid communication with said first membrane surface;
   means for receiving and confining a solution in fluid communication with said second membrane surface;
   a semiconductor pressure transducer having a characteristic output and a pressure-sensitive surface element in pressure communication with the contents of one of said receiving and confining means;
   a counter;
   means for resetting said counter;
   display means connected to said counter;
   means operatively connected to said transducer for generating pulses at a rate varying according to said characteristic transducer output; and
   means responsive to said resetting means and operatively connecting said counter to said pulse generating means for a predetermined time whereby said display may present a count related to the pressure in said one receiving and confining means.

3. An osmometer as defined in claim 2, and further including means for cyclically resetting said counter, whereby said display automatically presents a count related to the pressure existing in said receiving and confining means st fixed intervals.

4. In a membrane osmometer comprising a semipermeable membrane, body and cover blocks adapted to be solidly but separately joined together with respective faces of the blocks forming the junction, each block having a cavity formed in its respective face, the cavities being opposite each other when the blocks are joined, and the blocks being adapted to clamp the semipermeable membrane coextensively between the cavities; the improvement comprising
   A. a semiconductor pressure transducer having a housing with a pressure-sensitive portion, said semiconductor transducer being mounted in one of said blocks with said pressure-sensitive portion in direct, intimate contact with the contents of one of said cavities, and
   B. means to supply a solvent and a sample solution to a respective cavity comprising
      1. a first plurality of conduits providing an inlet and an outlet, a second plurality of conduits connecting to the cavity in said one block, and a third plurality of conduits leading to said respective face of said one block;
      2. means in said blocks providing alignment when said blocks are joined;
      3. a fourth plurality of conduits connecting to the cavity in the other one of said blocks and being located in matching relationship to said third plurality of conduits when said blocks are in joined alignment; and
      4. a laterally positionable distributing valve having at least two positions, said distributing valve being housed within one of said blocks, and said valve having means interconnecting related ones of said first and second plurality of conduits when in a first position, and related ones of said first and third plurality of conduits when in the second position.

5. An osmometer as defined in claim 4, said semiconductor pressure transducer having a characteristic output, and further including a counter, means for resetting said counter, display means connected to said counter, and means operatively connected to said transducer for generating pulses at a rate varying according to said characteristic transducer output, means responsive to said resetting means and operatively connecting said counter to said pulse generating means for predetermined time, whereby said display presents a count related to the pressure in said cavity.

6. An osmometer as defined in claim 5, and further including means for cyclically resetting said counter, whereby said display automatically presents a count related to the pressure existing in said cavity at fixed intervals.

7. An osmometer as defined in claim 6, wherein said characteristic output is a voltage and said pulse generating means is a continuously operating voltage-to-frequency converter.

8. An osmometer as defined in claim 7, wherein said semiconductor pressure transducer is a piezo-junction transistor.

9. An osmometer as defined in claim 4, wherein said blocks are rigid and a plurality of seals are provided between said blocks for isolating said third and fourth conduits within said junction, and said distributing valve has a member angularly movable to at least said two positions within said one block having said first, second and third plurality of conduits, each said conduit having a terminus in cooperative relationship with said movable valve member; said movable valve member being provided with at least a pair of channels, said channels interconnecting said first and second plurality of conduits when said member is in a first one of said two angular positions and interconnecting said first and third plurality of conduits when said member is in the other of said two positions.

10. An osmometer as defined in claim 9, wherein said terminus of each said conduit lies along a common line, with the termini of said inlet and outlet conduits respectively intermediate to one of said second plurality of conduits and one of said third plurality of conduits, and said movable valve member has two pairs of collinear channels, one pair at inner radial positions encompassing the termini of said first and second plurality of conduits and another pair of channels at outer radial positions encompassing the termini of said first and third plurality of conduits.

11. An osmometer as defined in claim 9, wherein said conduit termini lie along a common arc of particular radius and center, with the termini of said inlet and outlet conduits respectively intermediate to one of said second plurality of conduits and one of said third plurality of conduits, and said movable valve member's channels are arcuate, with radii and centers identical to said particular radius and center.

* * * * *